United States Patent [19]

Hakuraku et al.

[11] Patent Number: 4,785,636
[45] Date of Patent: Nov. 22, 1988

[54] MAGNETIC REFRIGERATOR AND REFRIGERATION METHOD

[75] Inventors: Yoshinori Hakuraku; Hideaki Mori, both of Ibaraki, Japan

[73] Assignee: Hitachi, Ltd., Tokyo, Japan

[21] Appl. No.: 71,346

[22] Filed: Jul. 9, 1987

[30] Foreign Application Priority Data

Jul. 11, 1986 [JP] Japan .................................. 61-161873

[51] Int. Cl.[4] ............................................. F25B 21/02
[52] U.S. Cl. .................................................... 62/3
[58] Field of Search ................................................ 62/3

[56] References Cited

U.S. PATENT DOCUMENTS 4,107,935  8/1978  Steyert, Jr. ............................... 62/3
4,332,135  6/1982  Barclay et al. ........................... 62/3
4,507,927  4/1985  Barclay ..................................... 62/3
4,599,866  7/1986  Nakagome et al. ...................... 62/3
4,625,519 12/1986  Hakaraku et al. ....................... 62/3
4,642,994  2/1987  Barclay et al. ........................... 62/3

Primary Examiner—Lloyd L. King
Attorney, Agent, or Firm—Antonelli, Terry & Wands

[57] ABSTRACT

In magnetic refrigeration wherein a magnetic Ericsson cycle or a magnetic Stirling cycle is realized, the present invention forms a heat path by which heat of a magnetic working substance at an isofield stage of high magnetic field or an isomagnetization stage of high magnetization is given to the magnetic working substance at an isofield stage of low magnetic field or an isomagnetization stage of low magnetization.

11 Claims, 7 Drawing Sheets

MAGNETIC REFRIGERATOR AND REFRIGERATION METHOD

BACKGROUND OF THE INVENTION

The present invention relates to a magnetic refrigerator and refrigeration method which utilize the magnetocaloric effect of a magnetic substance. More particularly, it is intended to provide a magnetic refrigerator which can operate at a high efficiency and over a wide range of temperatures without requiring a regenerator.

As described in any of the official gazette of Japanese Patent Application Laid-open No. 21958/1984, the specification of U.S. Pat. No. 4,332,135, the specification of U.S. Pat. No. 4,441,325, etc., a prior-art apparatus has needed a regenerator for periodically absorbing and radiating heat in a case where a magnetic refrigeration cycle is to be realized by the magnetic Stirling cycle or the magnetic Ericsson cycle.

With the prior art, when it is intended to obtain a regenerator having an excellent performance especially in a temperature range of 1° K. to 20° K., there is no suitable material (solid, liquid or gas) of great specific heat. This has led to the disadvantages that the volume of the regenerator becomes very large in the magnetic refrigeration cycle involving the regenerator, that a method of heat exchange becomes very complicated and that the efficiency of the regenerator is very low.

Moreover, with the prior art, in a case where an ideal magnetic refrigeration cycle is not attained due to the thermomagnetic characteristic of a magnetic working substance, the magnetic refrigeration cycle cannot be realized.

SUMMARY OF THE INVENTION

An object of the present invention is to provide a magnetic refrigerator and refrigeration method which carry out a magnetic refrigeration cycle independent of the performance of a regenerator.

Another object of the present invention is to provide a magnetic refrigerator and refrigeration method which can realize a magnetic refrigeration cycle even when an ideal magnetic refrigeration cycle is not attained on account of the thermomagnetic characteristic of a magnetic working substance.

The present invention for accomplishing the objects consists in a magnetic refrigerator having a working substance for magnetic refrigeration which generates heat when a magnetic field is applied thereto and which absorbs heat when a magnetic field is released therefrom, heat exchange means for radiating heat to outside when the working substance generates the heat isothermally and for absorbing heat from outside when the working substance absorbs the heat isothermally, and a magnetic field varying mechanism which can vary the magnetic field to be applied to the working substance, wherein a magnetic Ericsson cycle or a magnetic Stirling cycle, or a cycle similar thereto is realized as a magnetic refrigeration cycle; characterized by comprising heat transport means for establishing a heat path between an isofield stage of high magnetic field and an isofield stage of low magnetic field or between an isomagnetization stage of high magnetization and an isomagnetization stage of low magnetization in the two isofield stages or two isomagnetization stages of the magnetic refrigeration cycle, said two isofield stages or said two isomagnetization stages being realized by said heat path based on said means.

Another feature of the present invention consists in a magnetic refrigerator comprising a rotator which has a magnetic working substance at a plurality of outer peripheral parts thereof, stationary means disposed so as to surround said rotator, a high field device which is disposed at a part of said stationary means confronting the magnetic working substance, a hot source and a cold source which are disposed at parts of said stationary means confronting one surface of said rotator and corresponding to both circumferential sides of said high field device, and a thermal conductor which is disposed on said stationary means and which transmits heat generated by the magnetic working substance in a high field region, to the magnetic working substance in a low field region.

Still another feature of the present invention consists in a magnetic refrigeration method wherein when a working substance for magnetic refrigeration which generates heat upon applying a magnetic field thereto and which absorbs heat upon releasing a magnetic field therefrom generates heat isothermally, the generated heat is radiated to outside, and when the working substance absorbs heat isothermally, the heat is absorbed from outside, and wherein a magnetic Ericsson cycle or a magnetic Stirling cycle, or a cycle similar thereto is realized as a magnetic refrigeration cycle; characterized by comprising the step of transmitting the heat of the magnetic working substance at an isofield stage of high magnetic field or an isomagnetization stage of high magnetization, to the magnetic working substance at an isofield stage of low magnetic field or an isomagnetization stage of low magnetization.

Further features, objects and advantages of the present invention will become apparent from the ensuing description taken with reference to the accompanying drawings.

BRIEF DESCRIPTION OF THE DRAWINGS

FIG. 5(a) is a vertical sectional view showing an embodiment of the apparatus of the present invention, while

DESCRIPTION OF THE PREFERRED EMBODIMENTS

Figure 1A:
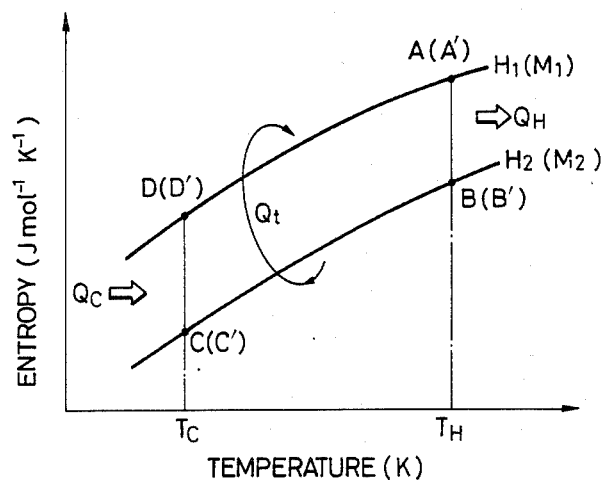
FIGS. 1(a) and 1(b) are graphs for explaining the refrigeration cycles of a magnetic refrigerator according to the present invention.
Figure 1B:
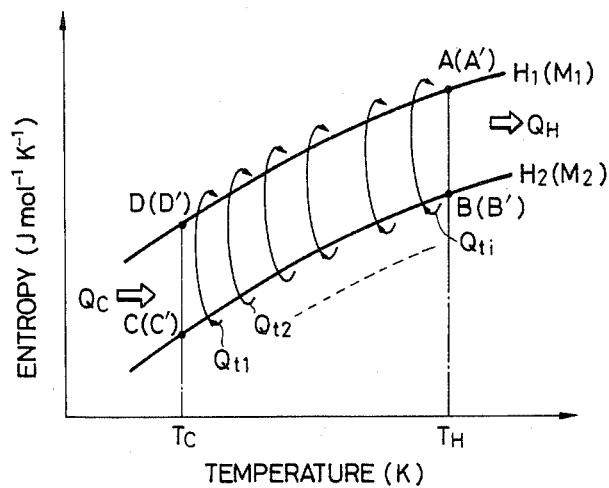

Now, an embodiment of the present invention will be described with reference to FIGS. 1(a) and 1(b). FIGS. 1(a) and 1(b) are diagrams showing the magnetic refrigeration cycles of magnetic working substances which are magnetic substances, for example, gadolinium-gallium-garnet ($Gd_3Ga_5O_{12}$) and dysprosium-aluminum-garnet ($Dy_3Al_5O_{12}$), respectively. In each figure, the axis of ordinates represents entropy, while the axis of abscissas represents temperature, and a control parameter is a magnetic field H (or magnetization M). Here, $H_1 < H_2$ (or $M_1 < M_2$) holds.

The magnetic Ericsson cycle is constructed of a series of stages consisting of an isothermal stage at a high temperature $T_H$ (A→B), an isofield stage for the magnetic field $H_2$ (B→C), an isothermal stage at a low temperature $T_C$ (C→D), and an isofield stage for the magnetic field $H_1$ (D→A).

Besides, the magnetic Stirling cycle whose control parameter is the magnetization M is constructed of a series of stages consisting of an isothermal stage at the high temperature $T_H$ (A'→B'), an isomagnetization stage for the magnetization $M_1$ (B'→C'), an isothermal stage at the low temperature $T_C$ (C'→D'), and an isomagnetization stage for the magnetization $M_2$ (D'→A').

The actual method of the magnetic refrigeration cycle of the present invention will be described by taking the case of the magnetic Ericsson cycle as an example. At the isothermal stage AB on the high temperature side, letting $\Delta S_H$ denote the variation of the entropy S on this occasion, the quantity of heat which is generated from the magnetic working substance to outside is $Q_H = T_H \Delta S_H$ in one cycle. Likewise, at the isothermal stage CD on the low temperature side, letting $\Delta S_C$ denote an entropy variation on this occasion, the quantity of heat which is absorbed into the magnetic working substance from outside is $Q_C = T_C \Delta S_C$ in one cycle. In an ideal cycle, $\Delta S_H = \Delta S_C$ holds, and hence, $Q_C/Q_H = T_C/T_H$ holds, and the magnetic refrigeration cycle is a reversible cycle. The isofield stage BC at the high magnetic field ($H_2$) and the isofield stage DA at the low magnetic field ($H_1$) are thermally connected through a heat path, and the generated component of the quantity of heat consequent upon the decrease of the entropy at the BC stage is continuously turned into the absorptive component of the quantity of heat consequent upon the increase of the entropy at the DA stage. In this way, the magnetic Ericsson cycle can be realized without temporarily storing cold in a regenerator as in the prior art. Regarding the aforementioned generated component of heat at the BC stage, the quantity of heat $Q_t$ is transported through the heat path as the absorptive component of heat at the DA stage. This quantity of heat $Q_t$ becomes as shown in FIG. 1(a). In actuality, the transport of heat through the heat path is effectively performed through heat paths which are obtained by dividing an operating temperature region into a plurality of parts as illustrated in FIG. 1(b).

Figure 2:
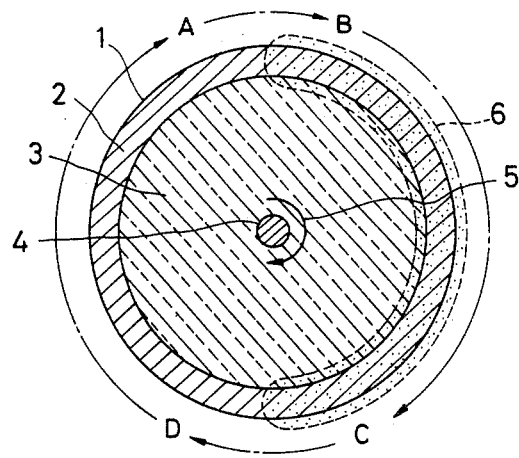
FIG. 2 is a diagram for explaining the principle of an embodiment of the present invention.
Figure 3:
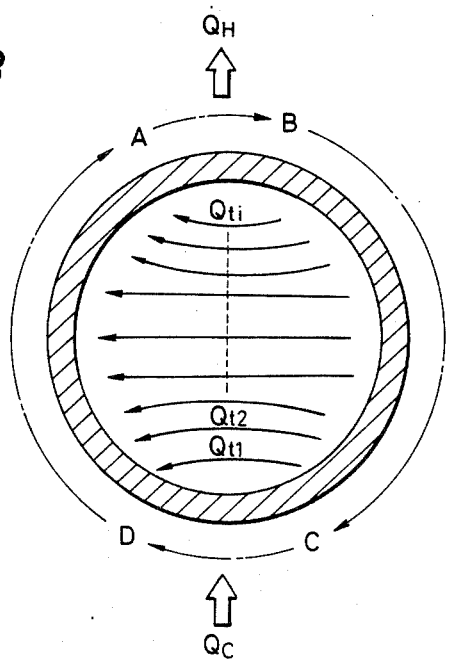
FIG. 3 is a diagram showing the state of the streams of heat in FIG. 2.

Next, the model of an actual apparatus will be described with reference to FIGS. 2 and 3. FIG. 2 is a principle diagram of a magnetic refrigerator of the rotating magnetic substance type for realizing the magnetic Ericsson cycle, in which the magnetic working substance is rotated and operated. A rotator 1 has a magnetic working substance 2 assembled in the outer peripheral part thereof. In order to suppress the circumferential transmission of heat, the magnetic working substance 2 is preferably divided into a plurality of parts, the adjacent ones of which are thermally insulated. A member 3 constituting the rotator 1 is rendered good in thermal insulation. The rotator 1 is rotated in a direction 5 by a rotary shaft 4. Numeral 6 designates a high field region which is formed by a magnet (not shown), and a region opposite thereto becomes a low field region. When the rotator 1 is rotated, the portions of the magnetic working substance 2 lying in the respective regions execute the magnetic refrigeration cycle shown in FIG. 1(a) or 1(b), substantially continuously in the state in which phases shift little by little. That is, the magnetic working substance 2 exists in any conditions of the respective stages of the magnetic refrigeration cycle A→B→C→D→A on the circumference of the rotator 1. The state of the streams of heat consequent upon the magnetic refrigeration cycles ABCDA ... is shown in FIG. 3. The heat $Q_H$ generated within the magnetic working substance at the isothermal magnetization stage AB is discharged to an external heat source. At the isofield stage BC, the temperature of the magnetic working substance is lowered. On this occasion, the entropy of the magnetic working substance decreases, and the quantity of heat then produced from the magnetic working substance is transported through the heat path to the magnetic working substance lying at the subsequent stage DA. That quantity of heat becomes $Q_{t1}, Q_{t2}, \ldots$ and $Q_{ti}$. At the isothermal demagnetization stage CD, the magnetic working substance 2 absorbs the quantity of heat $Q_C$ from an external heat source which is an object to be cooled. Besides, at the isofield stage DA, the temperature of the magnetic working substance is raised with the magnetic field held constant. On this occasion, the magnetic working substance 2 is supplied through the heat path with the aforementioned quantities of heat $Q_{t1}, Q_{t2}, \ldots$ and $Q_{ti}$ produced at the stage BC, and it has its entropy increased under the constant magnetic field. The magnetic refrigeration cycle is completed by the series of stages explained above. The present embodiment is such that one magnetic refrigeration cycle is executed each time the rotator 1 is rotated by one revolution.

Figure 4:
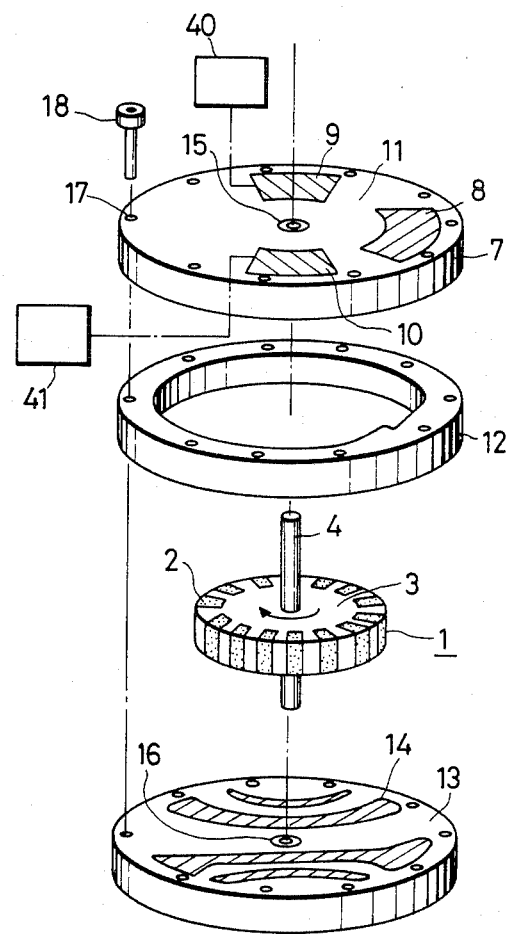
FIG. 4 is an exploded perspective view of an embodiment of the apparatus of the present invention.
Figure 5A:
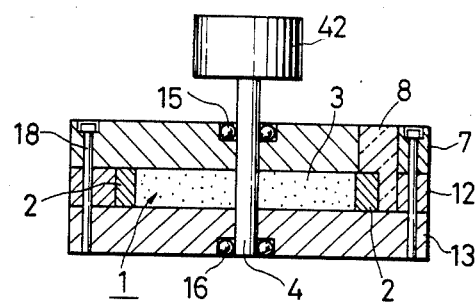
Figure 5B:
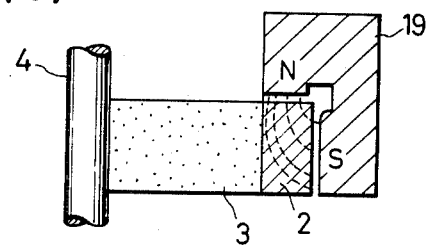
FIG. 5(b) is a sectional view of the magnet portion thereof.

An embodiment of the structure of a practicable apparatus will be described with reference to FIG. 4 and FIGS. 5(a) and 5(b). A stationary disc 7 is constructed of a high field device 8, a hot source 9 which is thermally connected with an external high-temperature source 40, a cold source 10 which is thermally connected with an external object to-be-cooled 41, and a thermally insulating material 11. Shown at numeral 12 is an intermediate support. A stationary disc 13 is inlaid with a thermal conductor 14, for example, copper, aluminum or sapphire, as anisotropic heat paths. The rotator 1 is supported by a bearing mechanism 15 provided in the stationary disc 7 and a bearing mechanism 16 provided in the stationary disc 13, and it is rotated by a driver 42 such as motor. The rotator 1 is received in the stationary disc 7, the intermediate supporter 12 and the stationary disc 13, and it is assembled by assemblage holes 17 as well as bolts 18. The high field device 8 is formed by a permanent magnet 19. The magnetic poles N and S of this magnet may well be opposite to illustrated ones.

Meanwhile, the magnetic Stirling cycle can be similarly realized by replacing the isofield region of the magnetic Ericsson cycle with the isomagnetization region.

As described above, according to the present embodiment, in the case of the magnetic Erricsson cycle, an isofield stage at a high magnetic field and an isofield stage at a low magnetic field are thermally connected through heat transport means based on a heat path, whereby magnetic refrigeration cycles can be continuously executed. More specifically, heat to be externally discharged in the case where a magnetic working substance undergoes the isofield stage (the high magnetic field) while lowering its temperature is utilized as a heat source in the case where the magnetic working substance undergoes the isofield stage (the low magnetic field) while raising its temperature. Thus, the magnetic Ericsson cycle can be realized without using a regenerator.

On the other hand, in the case of the magnetic Stirling cycle, the field stages of the magnetic Ericsson cycle stated above are substituted by isomagnetization stages, whereby a similar operation is possible.

Figure 6:
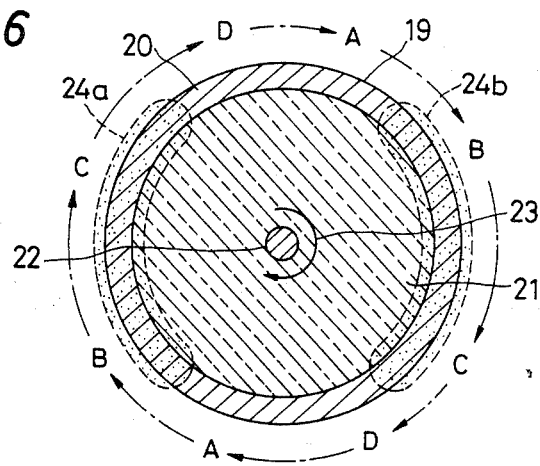
FIG. 6 is a principle diagram showing another embodiment of the present invention.
Figure 7:
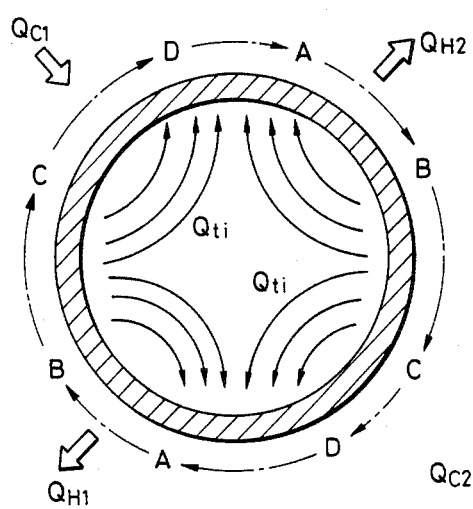
FIG. 7 is a diagram showing the state of heat streams in the embodiment of FIG. 6.

Next, another embodiment of the present invention will be described with reference to FIG. 6. A rotator 19 is constructed of a magnetic working substance 20 and a thermally insulating material 21. The rotator 19 is rotated in a direction 23 by a rotary shaft 22. It is provided with two high field regions 24a and 24b. Those circumferential parts of the rotator 19 which are not the high field regions serve as low field regions. According to the present embodiment, the magnetic working substance can execute two magnetic refrigeration cycles owing to one revolution of the rotator 19. The state of heat streams in the present embodiment is shown in FIG. 7. The discharged quantities of heat to outside at an isothermal stage are indicated by $Q_{H1}$ and $Q_{H2}$, the absorptive quantities of heat from outside at an isothermal stage are indicated by $Q_{C1}$ and $Q_{C2}$, and the state of the streams of heat through anisotropic heat paths is indicated by $Q_{ti}$.

According to the foregoing embodiments of the present invention, the magnetic Ericsson cycle or the magnetic Stirling cycle, or a cycle similar thereto can be realized without disposing a regenerator, so that the regenerator of high performance is dispensed with. This produces the effect that a magnetic refrigerator which is small in size and high in efficiency and which is operable in a wide range of temperatures can be provided.

Figure 8:
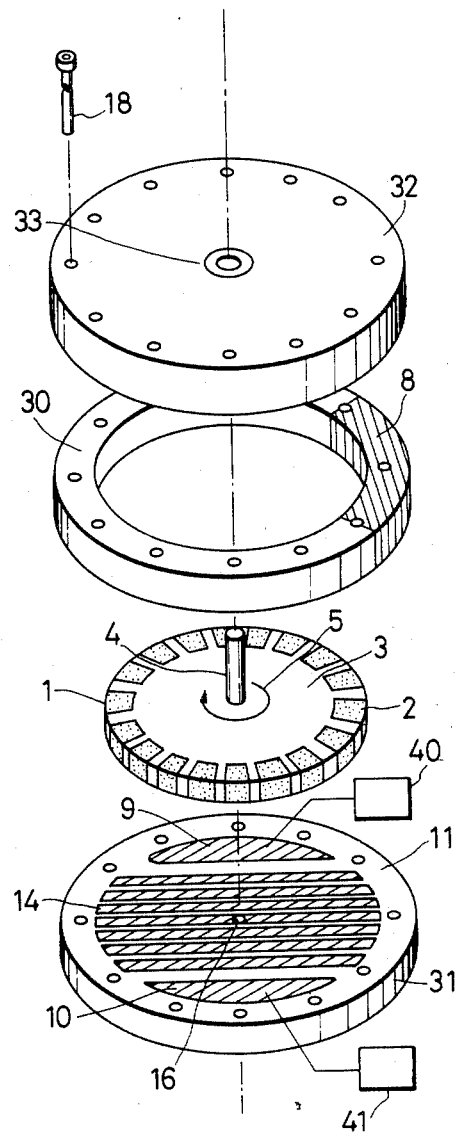
FIG. 8 is an exploded perspective view showing another embodiment of the present invention.

FIG. 8 shows still another embodiment of the present invention. A fixed spacer ring 30 has a high field device 8 which is made of a permanent magnet or the like. A stationary disc 31 is constructed of a hot source 9, a cold source 10, and a thermally insulating material 11. The stationary disc 31 is inlaid with a large number of strips of a thermal conductor 14, for example, copper, aluminum or sapphire, as anisotropic heat paths. A rotator 1 is supported by a bearing mechanism 16 provided in the stationary disc 31 and a bearing mechanism 33 provided in a stationary cover 32. The rotator 1 is received in the stationary disc 31, the stationary cover 32, and the fixed spacer ring 30 held between the stationary members 31 and 32, and it is assembled by assemblage bolts 18.

In the embodiment of FIG. 8, in case of the magnetic Ericsson cycle, the intensity of the magnetic field of the high field device 8 may be constant, but in case of the magnetic Stirling cycle, a magnet or the like with its field intensity changed so as to establish constant magnetization is used as the high field device 8. Besides, in the case of the magnetic Stirling cycle, that part of the spacer ring 30 which corresponds to the isomagnetization stage DA at the low magnetization in FIG. 1(a) or 1(b) should preferably be formed with a low field device (magnet) with its field intensity changed for constant magnetization.

Next, there will be described an embodiment in the case where an ideal magnetic refrigeration cycle is not attained on account of the thermomagnetic characteristic of a magnetic working substance.

According to an entropy-temperature diagram the parameter of which is a magnetic field for a magnetic working substance, it is often the case that, in the vicinity of a magnetic transition temperature, for example, a Curie point or a Neel point, in which a particularly great entropy change can be attained, the entropy variation between two isofield curves to-be-handled is not constant in an operating temperature range near the magnetic transition temperature. In such a case, an ideal magnetic refrigeration cycle having two isofield stages cannot be realized.

Figure 9:
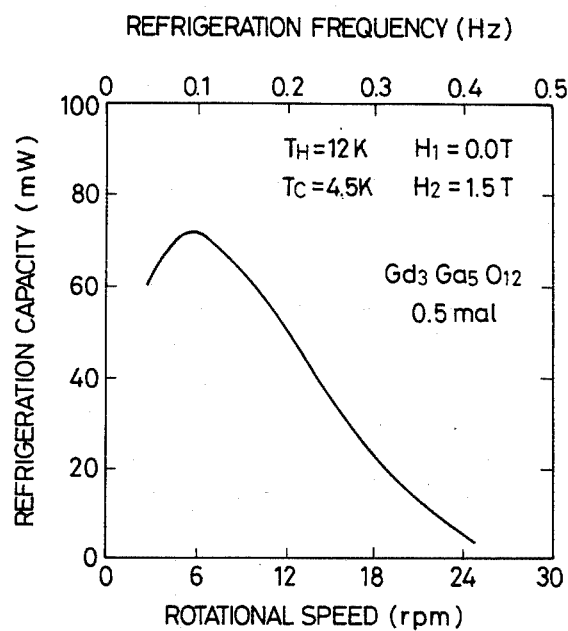
FIG. 9 is a graph showing an example of the relationship between a refrigeration capacity and a rotational speed, which was obtained by the analysis of refrigeration cycles.
Figure 10:
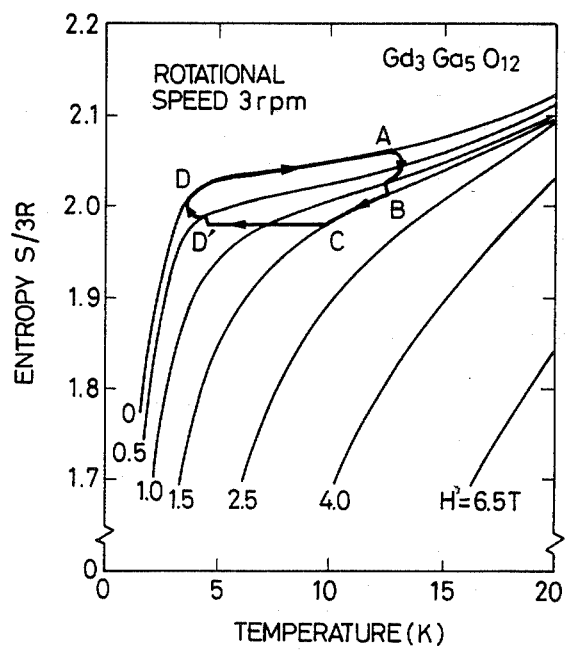
FIG. 10 is a graph showing an example of a cycle locus in the entropy-temperature diagram of a magnetic working substance, which was obtained by a refrigeration cycle analysis.

FIG. 9 is a graph showing an example of the refrigeration cycle of the embodiment illustrated in FIG. 8. The magnetic working substance was single-crystal $Gd_3Ga_5O_{12}$, the whole amount of which was 0.5 mol. The temperature of the hot source 9 was $T_H=12$ K, while that of the cold source 10 was $T_C=4.5$ K. The low field region was set at $H_1=0.0$ T, while the high field region was set at $H_2=1.5$ T. As the result of the cycle analysis, the refrigeration capacity $Q_C$ of the embodiment became the largest at a refrigeration frequency of about 6 r.p.m. as depicted in the graph. Next, a locus in the entropy-temperature diagram of the magnetic working substance is shown in FIG. 10 as to a case of a rotational speed of 3 r.p.m. The two isothermal stages AB and CD are substantially isothermal at the respective temperature levels. Also, the isofield stage DA on the low field side changes under a substantially equal field. However, the isofield stage BC on the high field side must combine an isofield stage BC and an adiabatic stage CD′. The reason therefor is that the energy balance between the stage DA and the stage BC is indispensable. This will be rearranged on an entropy-temperature diagram of FIG. 11 and will now be described.

The axis of ordinates represents the entropy S of a magnetic material which is used as the working substance, while the axis of abscissas represents the temperature T of the magnetic material. A straight line 35 indicates an entropy-temperature characteristic in the low isofield $H_1$, and a straight line 36 an entropy-temperature characteristic in the high isofield $H_2$. In actuality, these straight lines 35 and 36 are curves in many cases. The magnetic refrigeration cycle proceeds as follows: A→B indicates an isothermal magnetization stage at a high temperature end, B→C an isofield stage under the high field $H_2$, C→D′ an adiabatic demagnetization stage, D′→D an isothermal demagnetization stage at a low temperature end, and D→A an isofield stage under the low field $H_1$. Entropy variations $\Delta S_{AB}$ and $\Delta S_{D'D}$ at the two isothermal stages A→B and D′→D are equal. The magnetic Ericsson cycle has the C→D stage formed only of the isothermal stage. Such a cycle has the demagnetization stage at the low temperature end formed of the adiabatic stage →the isothermal stage, and can be called a "pseudo magnetic Ericsson cycle."

Figure 11:
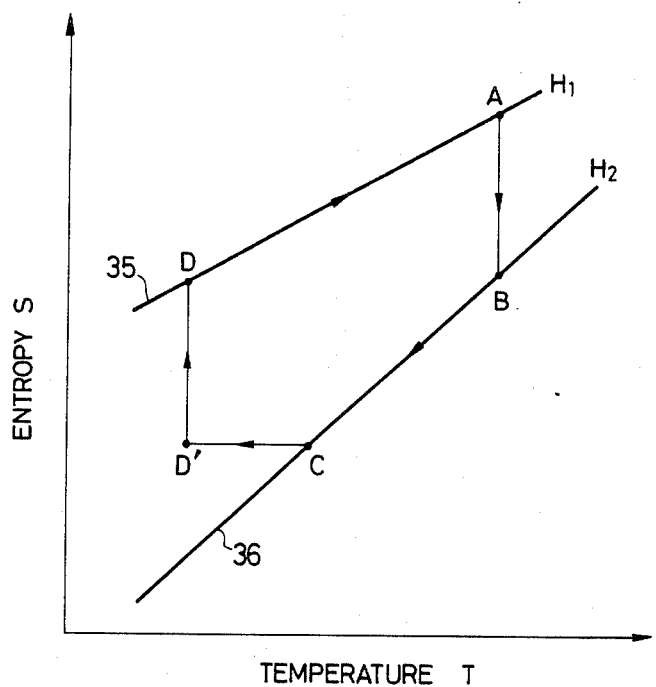
FIG. 11 is a graph for explaining a magnetic refrigeration cycle in still another embodiment of the present invention.
Figure 12:
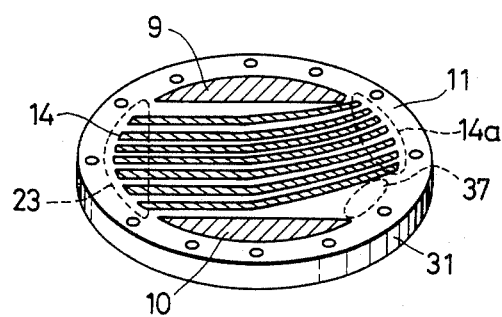
FIG. 12 is a perspective view of essential portions for explaining a practicable embodiment which realizes the magnetic refrigeration cycle shown in FIG. 11.

FIG. 12 shows an embodiment for realizing the magnetic refrigeration cycle illustrated in FIG. 11. A heat path 14a for the BC stage region is brought nearer to a hot source 9, and an adiabatic stage region 37 is formed nearer to a cold source 10. In addition, the high field device 8 in FIG. 8 is brought circumferentially nearer to the hot source 9 so that the adiabatic stage region 37 may become a demagnetization stage region. Owing to such a construction, the cycle of FIG. 11 can be realized. Besides, the field distribution of the high field region may be adjusted without changing the setup of heat paths 14. On this occasion, the distribution of the heat paths 14b of the DA stage is left unchanged. Instead of arranging the high field device 8 nearer to the hot source 9, the intensity of the magnetic field of the device 8 on the side of the cold source 10 may be lowered.

According to this embodiment, entropy variations at the isothermal stages at the hot end and the cold end can be equalized, so that a magnetic refrigerator capable of realizing a magnetic refrigeration cycle of high efficiency can be provided.

What is claimed is:

1. In a magnetic refrigerator having a working substance for magnetic refrigeration which generates heat isothermally as a magnetic field is supplied thereto and which absorbs heat isothermally as a magnetic field is released therefrom,
   heat exchange means for radiating heat to outside when the working substance generates the heat isothermally and for absorbing heat from the outside when the working substance absorbs heat isothermally;
   means for producing a varying magnetic field that is applied to the working substance to produce a magnetic refrigeration cycle; and
   heat transport means made of an anisotropic thermal conductor for establishing a heat path between an isofield stage of high magnetic field and an isofield stage of low magnetic field, or between an iosmagnetization stage of high magnetization and an isomagnetization stage of low magnetization in the two isofield stages or two isomagnetization stages of the magnetic refrigeration cycle.

2. A magnetic refrigerator as defined in claim 1, further including a rotor for carrying said working substance about an axis of rotation and wherein the thermal conductor is a solid body disposed on a stationary disc which adjoins in close proximity to said rotator.

3. A magnetic refrigerator comprising:
   a rotator which has a magnetic working substance at a plurality of outer peripheral parts thereof;
   stationary means disposed so as to surround said rotator;
   a high magnetic field device which is disposed at a part of said stationary means confronting the magnetic working substance, a hot source and a cold source which are disposed at spaced positions around the periphery of said stationary means confronting one surface of said rotator and corresponding to both circumferential sides of said high field device; and
   an isotropic thermal conductor which is disposed on said stationary means and which transmits heat generated by the magnetic working substance in a high field region, to the magnetic working substance in a low field region.

4. A magnetic refrigerator as defined in claim 3, further comprising a thermally insulated region which has a field intensity less than the intensity in said high field region located between said high field device and said cold source.

5. In a magnetic refrigeration method wherein when a working substance for magnetic refrigeration which generates heat upon applying a magnetic field thereto and which absorbs heat upon releasing a magnetic field therefrom generates heat isothermally, the generated heat is radiated to outside, and when the working substance absorbs heat isothermally, the heat is absorbed from outside to produce a magnetic refrigeration cycle; an improvement comprising the step of transmitting the heat of the magnetic working substance at an isofield stage of high magnetic field or an isomagnetization stage of high magnetization, to the magnetic working substance at an isofield stage of low magnetic field or an isomagnetization stage of low magnetization by means including a plurality of spaced strips of an isotropic thermally conductive solid material.

6. A magnetic refrigeration method as defined in claim 5 wherein said thermally conductive material is selected from a group consisting of copper, aluminum and sapphire.

7. The refrigerator as defined in claim 3 wherein the isotropic thermal conductor is a material selected from a group consisting of copper, aluminum and sapphire.

8. The magnetic refrigerator as defined in claim 3 wherein said hot source and said cold source are positioned diametrically opposite each other relative to a rotational axis of said rotator.

9. A magnetic refrigerator as defined in claim 3 wherein two hot sources are positioned at diametrically opposed locations and two cold sources are positioned at two diametrically opposed locations midway between respective hot source locations.

10. In a magnetic refrigerator having a working substance for magnetic refrigeration which generates heat isothermally as a magnetic field is applied thereto and which absorbs heat isothermally as a magnetic field is released therefrom;
    means for producing a high magnetic field in a region, said field being disposed relative to said working substance so that the magnetic field applied to said working substance varies to produce also a magnetic field region and a magnetic cycle corresponding approximately to either an Ericsson cycle or a Stirling cycle; and
    heat transport means including a plurality of spaced strips of an isotropic thermal conductor formed to make direct thermal conduction from said high magnetic field region to said low magnetic field region.

11. A magnetic refrigerator as defined in claim 10 wherein said spaced strips are made of copper positioned on a surface of a housing member to provide thermal transfer means directly through thermal conduction.

* * * * *